Patented Jan. 11, 1944

2,338,864

UNITED STATES PATENT OFFICE 2,338,864

VULCANIZATION OF RUBBER

Roger A. Mathes, Akron, Ohio, assignor to The B. F. Goodrich Company, New York, N. Y., a corporation of New York No Drawing. Application December 26, 1940, Serial No. 371,789

4 Claims. (Cl. 260—790)

This invention relates to the vulcanization of rubber and pertains specifically to the acceleration of vulcanization by the reaction product of a 2-mercapto thiazoline, ammonia, and formaldehyde.

It has long been known that the vulcanization of rubber can be accelerated by various compounds, among which are the mercaptothiazoles and many derivatives. 2-mercapto thiazoline, however, has been reported as a weak accelerator. I have now discovered that the reaction products of the 2-mercapto thiazolines with ammonia and formaldehyde serve as excellent accelerators when used in conjunction with monocarboxylic acids or their metallic salts. Among the 2-mercapto thiazolines which may be used in the synthesis of my new accelerators, are 2-mercapto thiazoline itself, 2-mercapto 4-methyl thiazoline, 2-mercapto 5-methyl thiazoline, 2-mercapto 4,5-dimethyl thiazoline, 2-mercapto 4-ethyl thiazoline, 2-mercapto 4,5-diethyl thiazoline, 2-mercapto 4-phenyl thiazoline, 2-mercapto 4-methoxy thiazoline, 2-mercapto 4,5-tetramethylene thiazoline, 2-mercapto 4-p-aminophenyl thiazoline, and the like.

As a specific example of my new accelerators I have prepared the reaction product of 2-mercapto thiazoline with ammonia and formaldehyde. 59.5 g. of 2-mercapto thiazoline were suspended in 47 ml. of aqueous ammonia. To this suspension 86 ml. of 37% formaldehyde solution were added over a period of 5 minutes at a temperature of 30° to 50° C. The solid momentarily disappears leaving an oil layer which rapidly crystallizes. The product is a fine white powder melting at 170° C., practically theoretical yields being obtained.

The reaction is believed to take place as follows:

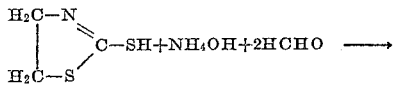

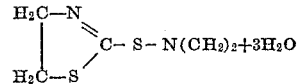

The product of the reaction was milled into the following composition:

| | |
|---|---|
| Rubber | 100 |
| Zinc oxide | 5 |
| Sulfur | 3 |
| Lauric acid | 3 |
| Accelerator | 1 |

When cured in a mold at the specified temperatures the stock had the following properties, where T=ultimate tensile strength in pounds per square inch and E=elongation in per cent.

| Temperature of cure | Time of cure | Modulus at 600% elongation | T | E |
|---|---|---|---|---|
| 220° F | 60 | | 230 | 1,020 |
| | 90 | 120 | 870 | 970 |
| | 120 | 260 | 1,990 | 1,010 |
| 240° F | 15 | | | 1,130 |
| | 30 | | 390 | 1,040 |
| | 60 | 620 | 2,290 | 860 |
| | 90 | 970 | 2,940 | 790 |
| 287° F | 15 | 990 | 3,290 | 795 |
| | 30 | 1,980 | 3,500 | 700 |
| | 60 | 2,180 | 3,230 | 660 |

These results show that my new accelerator not only has a desirable delayed action effect at low temperatures, but also gives tight cures with good tensiles at 287° F.

A saturated or unsaturated monocarboxylic acid is used together with my new accelerators in the preferred embodiment of the invention. Such acids comprise caprylic, lauric, stearic, oleic, linoleic, palmitic, benzoic, salicylic, and the like; or the salts of such acids with sodium, magnesium, lead, zinc, tin, or any other alkali, alkaline earth, or heavy metals may be used. Effective activation of the accelerator is secured with only a trace of these materials, but I prefer to use them in concentrations of 1% to 5% or more in the rubber composition. The higher members of the fatty acid series are generally to be preferred to the lower members.

My new accelerators are effective not only with natural rubber or caoutchouc, but also with balata, gutta percha, latex, rubber isomers, or any synthetic rubber which can be vulcanized, that is, which can lose its property of thermoplasticity and become elastic when heated in the presence of sulfur, and the term "a rubber" is used in the claims to designate all of the above-mentioned materials. Other substances, such as pigments, fillers, reinforcing agents, softeners, antioxidants, accelerators, etc., may be present.

The compositions vulcanized with my new accelerators are not limited in use, but may serve a wide variety of functions in pneumatic and solid tires, hose, belting, footwear, surgical goods, latex-dipped goods, all manner of molded goods, and the like.

Any of the usual methods of vulcanization, such as heating in a mold, with hot air, hot water, steam, etc., is satisfactory with my new accelerators.

Although I have herein disclosed specific embodiments of my invention I do not intend to limit myself solely thereto, but only as indicated by the spirit and scope of the appended claims.

I claim:

1. The process of vulcanizing a rubber in the presence of the reaction product of a compound having the structure

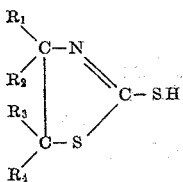

in which $R_1$, $R_2$, $R_3$, and $R_4$ are members of the class consisting of hydrogen, hydrocarbon and alkoxy groups, with aqueous ammonia and with formaldehyde, said reaction being carried out at atmospheric pressure; and in the presence of a member of the class consisting of monocarboxylic acids and their metallic salts.

2. The process of vulcanizing a rubber in the presence of the reaction product of 2-mercaptothiazoline with aqueous ammonia and with formaldehyde, said reaction being carried out at atmospheric pressure to yield a crystalline solid melting at about 170° C.; and in the presence of a member of the class consisting of monocarboxylic acids and their metallic salts.

3. A composition comprising a rubber vulcanized in the presence of the reaction product of a compound having the structure

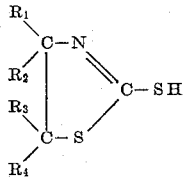

in which $R_1$, $R_2$, $R_3$, and $R_4$ are members of the class consisting of hydrogen, hydrocarbon and alkoxy groups, with aqueous ammonia and with formaldehyde, said reaction being carried out at atmospheric pressure; and in the presence of a member of the class consisting of monocarboxylic acids and their metallic salts.

4. A composition comprising a rubber vulcanized in the presence of the reaction product of 2-mercaptothiazoline with aqueous ammonia and with formaldehyde, said reaction being carried out at atmospheric pressure to yield a crystalline solid melting at about 170 C.; and in the presence of a member of the class consisting of monocarboxylic acids and their metallic salts.

ROGER A. MATHES.